INVENTOR
WILLIAM RICHARD CLIFFORD
GEARY
By Irwin L. Thompson
ATTY.

June 22, 1965  W. R. C. GEARY  3,190,265
ANIMAL HANDLING APPARATUS
Filed March 15, 1963  6 Sheets-Sheet 4

INVENTOR
WILLIAM RICHARD CLIFFORD GEARY

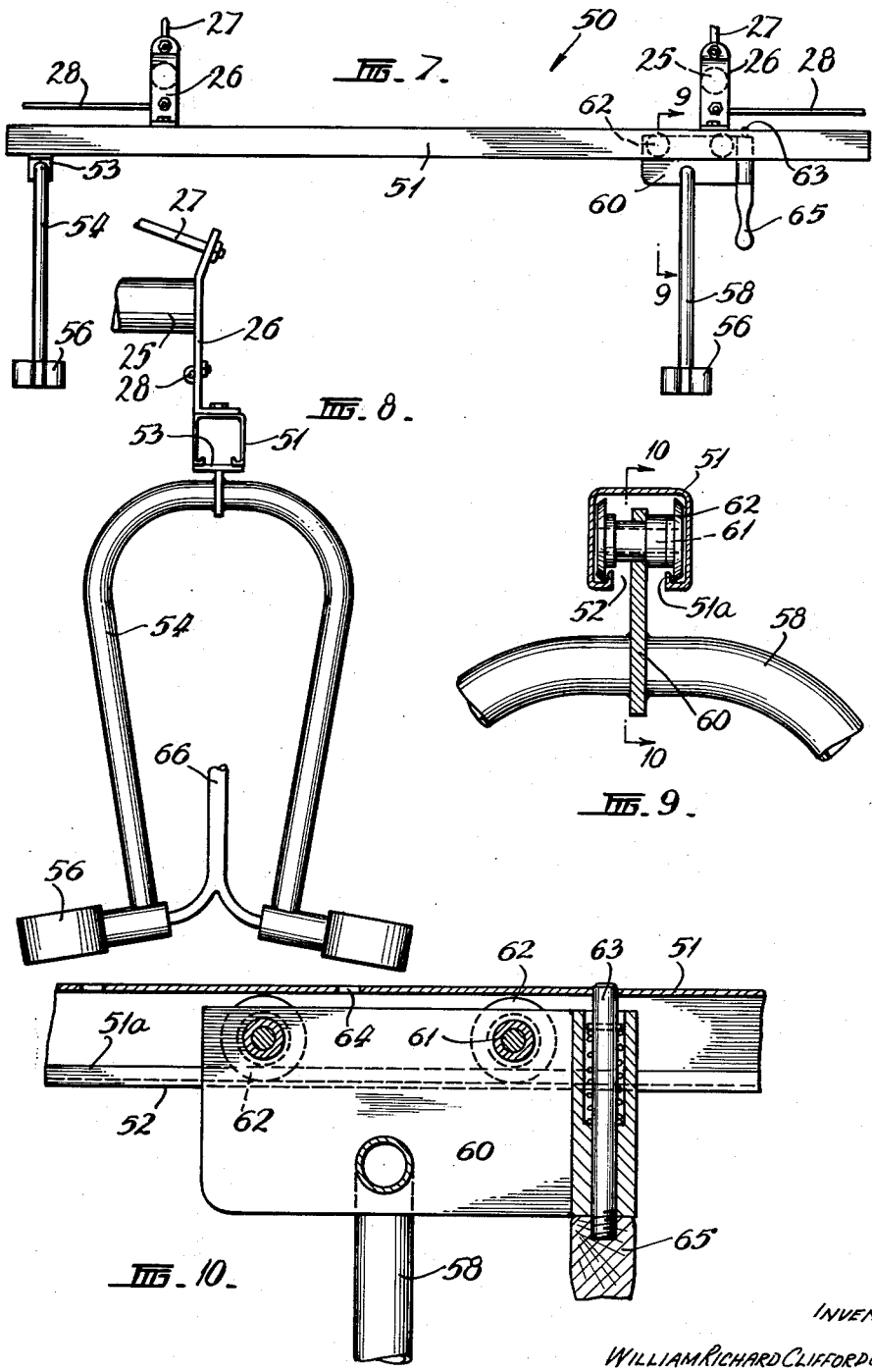

June 22, 1965 W. R. C. GEARY 3,190,265
ANIMAL HANDLING APPARATUS
Filed March 15, 1963 6 Sheets-Sheet 6
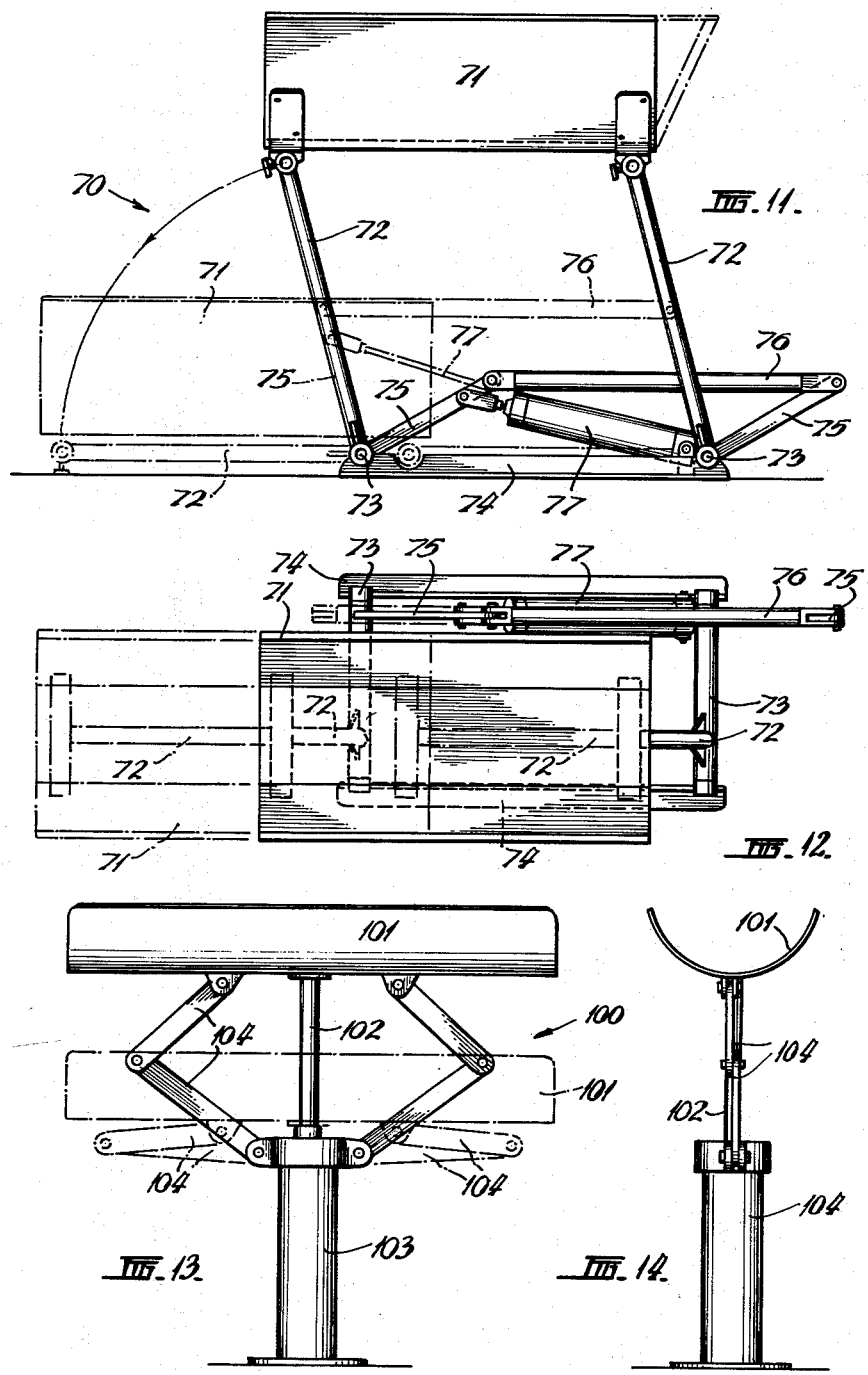
INVENTOR
WILLIAM RICHARD CLIFFORD GEARY
By Irwin S. Thompson
ATTY.

3,190,265
ANIMAL HANDLING APPARATUS
William Richard Clifford Geary, 1A Bibby Court,
Moorabbin, Victoria, Australia
Filed Mar. 15, 1963, Ser. No. 265,530
Claims priority, application Australia, Mar. 19, 1962,
15,497/62
15 Claims. (Cl. 119—103)

This invention relates to apparatus for conveying animals, especially sheep, to a series of treatment positions while suspended by their legs and to means for facilitating the attachment of the animals to the conveyor means and their subsequent removal therefrom.

Among the operations which may conveniently be carried out on sheep while they are suspended in this way are: shearing, crutching, weighing, dipping, jetting, vaccination, mulesing, branding, dagging, drenching, foot paring, and in the case of ewes, artificial insemination.

The invention includes animal handling apparatus comprising conveyor means movably supported in an elevated position a plurilty of spaced carriers fixed to and supported by the conveyor means, each of said carriers being adapted to suspend an animal by the legs, and means operable to actuate said conveyor means intermittently thereby to move the carriers along an endless path and to arrest them in succession at a plurality of stations including a loading station and an unloading station.

The said conveyor means preferably comprises a member supported for rotation about a substantially vertical axis and having the said suspension carriers attached to and depending from the periphery thereof.

Each of the said carriers preferably comprises a horizontal beam provided with two longitudinally spaced and transversely opposed pairs of depending supports for corresponding leg clamps and provision is preferably made for adjusting the distance between the depending supports lengthwise of the beam to suit the size of the animals to be handled.

For this purpose the beam is preferably of hollow box shape in cross section and at least one of said transversely opposed pairs of depending supports is attached through a longitudinal slot in the bottom of the beam to a carriage which is movably mounted therein.

The invention also includes a raising or lowering unit for the animals to be handled, said unit comprising a trough like cradle open at one at least of its ends and having downwardly converging side walls whereby an animal supported on its back therein is restrained against excessive body movements and including means for raising and lowering said cradle.

When the said unit is used to present the animals for attachment to the leg clamps of the successive animal carriers, the said raising and lowering means preferably includes means such as parallel links by means of which the cradle is maintained substantially horizontal at all times.

The invention further includes animal unloading means comprising an elevated trough-like cradle into which each animal is deposited on its back by the release of the leg clamps, a slide arranged at one side of and below the cradle and means operable to cause the cradle to tilt or collapse sidewardly to discharge the animal onto the slide.

The invention additionally includes a vertically movable table arranged below one of the said carrier stations to support the back of an inverted animal located at that station, said table being preferably of shallow upwardly concave shape in cross section to locate the animal therein.

In the accompanying drawings which illustrate one exemplary construction of apparatus according to the invention:

FIGURE 7 is a view in side elevation of a suspension carrier.

FIGURE 8 is a view in end elevation of the carrier.

FIGURE 9 is a view in sectional end elevation taken on the line 9—9 at FIGURE 7.

FIGURE 10 is a view in longitudinal section taken on the line 10—10 of FIGURE 9.

FIGURE 11 is a view in side elevation of a loading cradle.

FIGURE 12 is a view in plan of the loading cradle.

FIGURE 13 is a view in side elevation of a vertically adjustable table.

FIGURE 14 is a view in side elevation of the supporting table and

FIGURE 15 is a view in end elevation of carriage unloading means.

Figure 1:
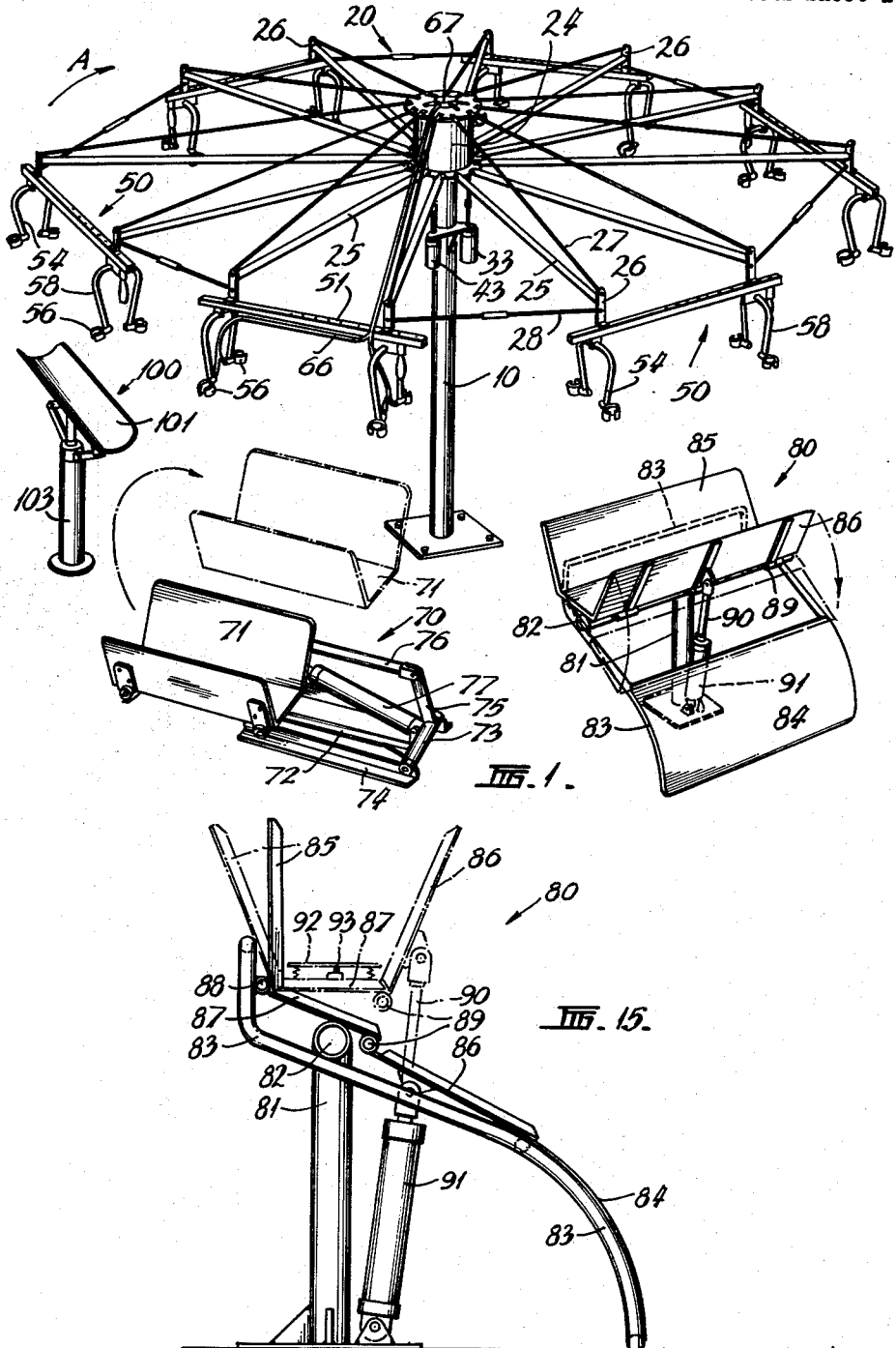
FIGURE 1 is a perspective view of a handling plant for sheep.

The sheep handling plant shown in FIGURE 1 comprises a fixed column 10 having a relatively large and approximately circular head frame, generally designated 20, mounted on its upper end for rotation about the axis of the column. The periphery of this head frame is fitted with any suitable number of equally spaced suspension carriers generally designated 50 each carrier being adapted to support an individual animal so that it is suspended therefrom by its legs.

The illustrated apparatus is provided with six of the said carriers 50 and means which hereinafter are described are provided for intermittently rotating the head frame in the direction of the arrow "A" whereby each carrier is arrested in turn at each of a plurality of equally spaced stations, the number of such stations being preferably equal to the number of carriers. One of these stations is a loading station at which an inverted animal is attached to each carrier and a loading unit generally designated 70 is arranged at that station. The treated animals are successively removed from the carriers at an unloading station at which an unloading unit generally designated 80 is located. Preferably and as shown the unloading station is that station which immediately precedes the loading station.

The requisite treatment operations are carried out at the several stations arranged between the loading and unloading stations and some of these operations may be performed mechanically by means not included in the present invention and not shown in the drawings.

Some operations which are manually performed are facilitated if the back of the sheep is supported and FIGURE 1 shows a vertically adjustable supporting table 100 provided for this purpose below one of the stations.

Referring now to FIGURES 2 to 6 inclusive the upper end of the column 10 is provided with an extension tube 11 which in turn has an annular cup 14 detachably secured to its upper end. This cup is fitted with a thrust bearing 16 for a tubular pivot spindle 21 of the head frame 20 and this spindle extends downwardly into the extension tube 11 and engages a roller bearing 15 therein.

A flange 22 on the projecting upper end of the pivot spindle 21 is secured centrally to the underside of a plate 23 and a hub tube 24 welded to and depending from the underside of this plate is arranged concentrically about the upper end of the column but is substantially larger in diameter than the latter.

The hub tube is provided at its lower end with an outwardly projecting circumferential flange to which the inner ends of a plurality of equally spaced radial arms 25 are secured and the outer end of each arm is rigidly fitted with a short vertical bracket 26 which has its upper end connected by a corresponding tie rod 27 to the central plate 23.

The lower end of each bracket is secured to the top of one end portion of the horizontal beam 51 of a corresponding animal carrier 50 so that each of these beams rigidly connects the outer ends of one adjacent pair of the radial arms 25 while those brackets which support the adjacent ends of adjacent carrier beams are connected together by tie wires 28. Thus two radial arms are provided for each carrier beam 51 though it will be understood that the rotatable head frame may be constructed in any other suitable manner.

Figure 2:
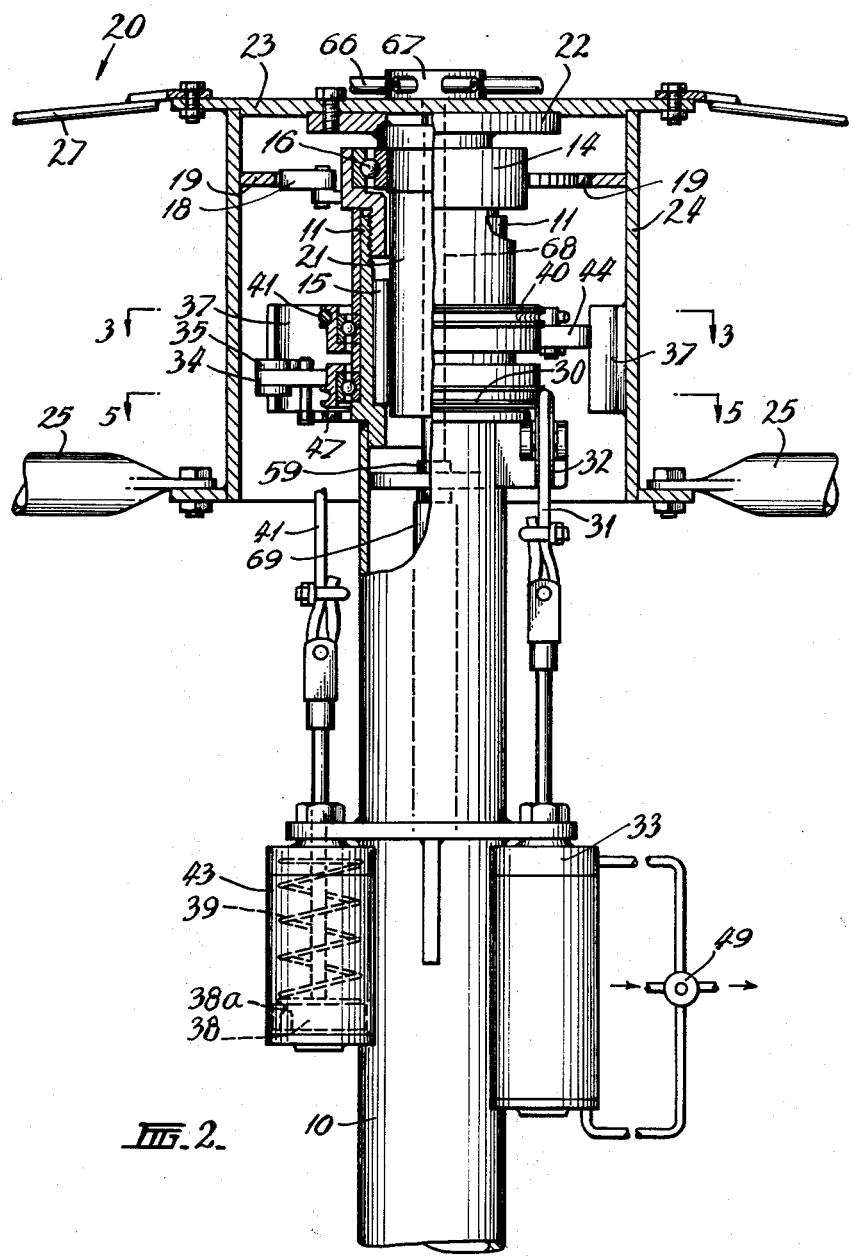
FIGURE 2 is a view in elevation and partly in section of mounting and drive means for the rotary conveyor shown in FIGURE 1.

The head frame 20 can rotate only in the direction of the arrow A as retrograde movements thereof are prevented by a spring-pressed pivotal pawl 18 mounted on the aforesaid bearing cup 14 at the top of the column and engaging a ring 19 of ratchet teeth fixed to the inner periphery of the housing tube as shown in FIGURE 2.

Any suitable means may be provided for intermittently rotating the head frame and the preferred mechanism, which is shown in the drawings, comprises two co-axial rings 30 and 40 which are rotatively mounted about the lower end portion of the extension tube 11 on the column 10 and are suitably restrained against endwise movements. The lower ring 30, hereinafter referred to as the drive ring, is formed with a circumferential groove for a cable 31 which has one of its ends anchored to the ring and this cable passes tangentially from the ring and downwardly over guide roller 32 to the plunger rod of a vertical double acting air cylinder 33 fixed to the column 10 below the hub tube 24. The plunger of this cylinder, which is hereinafter referred to as the drive cylinder, serves to rotate the head frame intermittently as hereinafter explained.

The upper rotatable ring 40, hereinafter termed the brake ring, is similarly formed with a groove for a cable 41 which has one of its ends secured to that ring and this cable is led from the ring and then downwardly over a guide roller 42 to the plunger of a pneumatic brake cylinder 43 which also is fixed to the column 10.

The drive ring 30 is formed with an outwardly projecting lug 34 carrying a pivoted drive pawl 35 which is urged outwardly by a spring 36 so that its free end bears against the inner periphery of the hub tube 24 and the latter is provided with an internal ring of spaced driving projections 37 for engagement by the pawl. These driving projections may advantageously be provided on a sleeve which is removably arranged within and fixed to the hub tube in order that a sleeve with a different number of driving projections may be substituted when desired.

Figure 3:
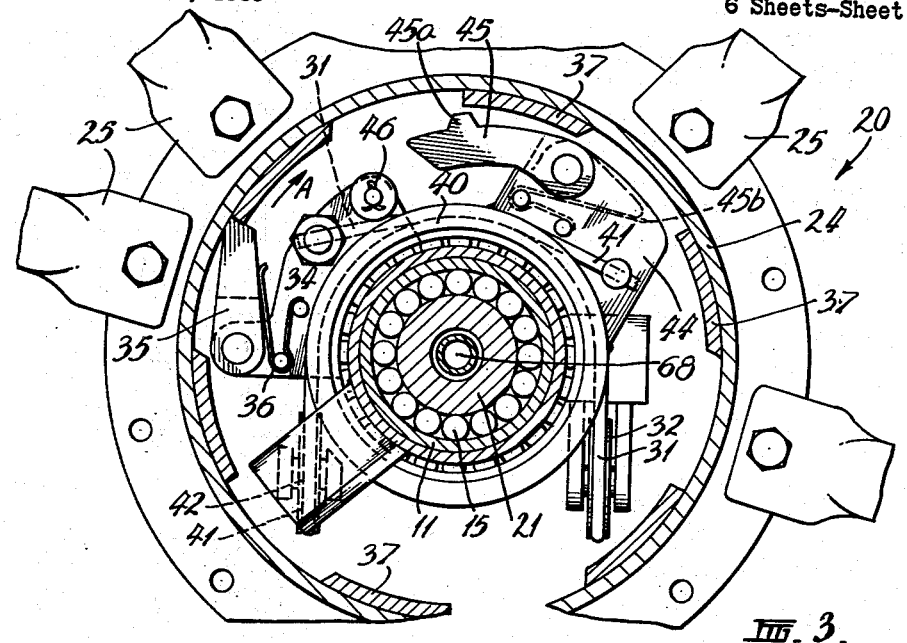
FIGURES 3 and 4 are views in sectional plan taken on the line 3—3 of FIGURE 2 and show different stages in the operation of the apparatus.

The plunger of the drive cylinder is normally disposed at the upper end of its stroke and when air under pressure is supplied to the upper end of the cylinder by operation of a reversing valve 49, the plunger is forced downwardly so that the cable 31 rotates the drive ring in the direction of the arrow A in FIGURES 1 and 3 and the engagement between the drive pawl 35 and one of the projections 37 on the hub tube constrains the head frame 20 to turn in unison therewith.

Figure 4:
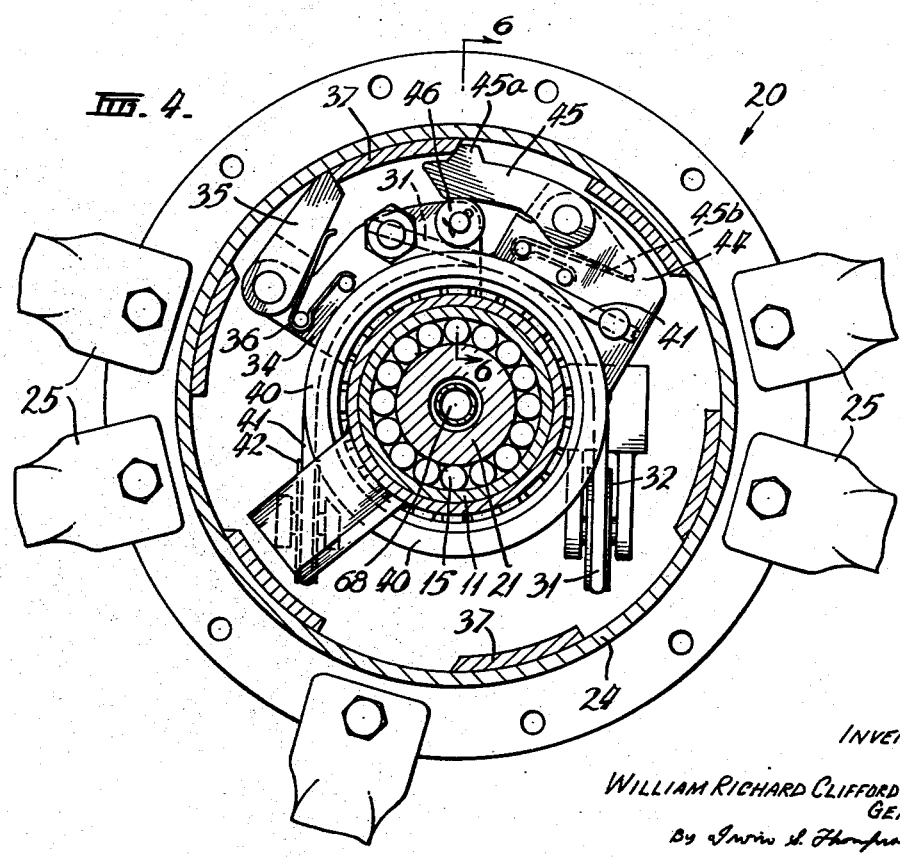
Figure 5:
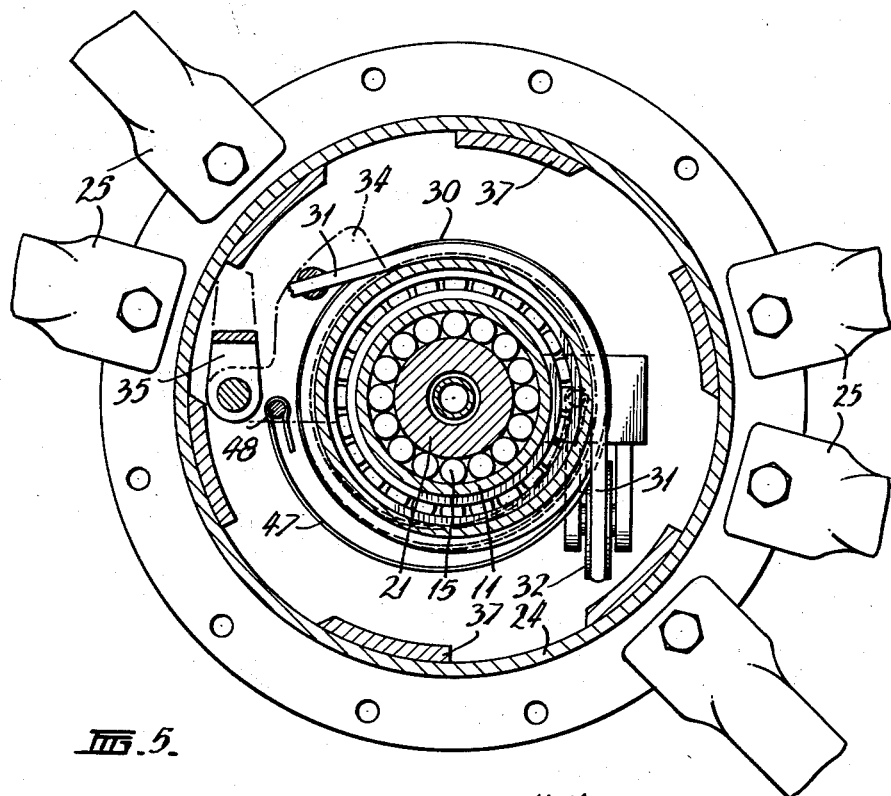
FIGURE 5 is a view in sectional plan taken on the line 5—5 of FIGURE 2.
Figure 6:
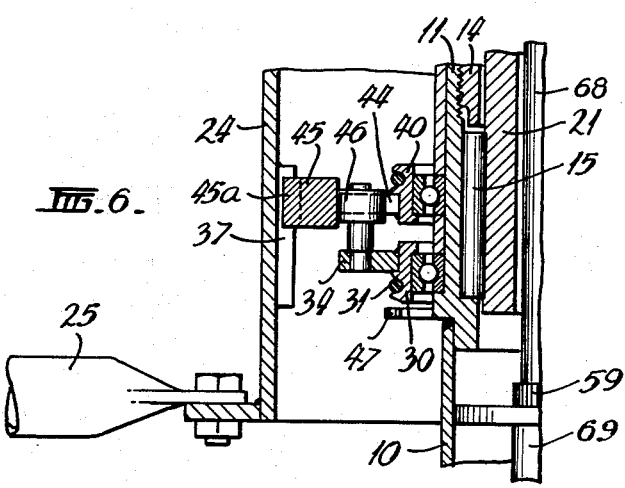
FIGURE 6 is a view in sectional elevation taken on the line 6—6 of FIGURE 4.

The brake ring 40 is also formed with a projecting lug 44 carrying a pivoted pawl 45 which however is normally retracted by a spring 45b so that a nib 45a on the pawl is withdrawn from the path of the drive projections 37 on the inner periphery of the hub tube. A roller 46 mounted on the leading end of the lug 34 on the drive ring is disposed in the path of the brake pawl 45 and the free end of the inner face of this pawl is inclined whereby during each intermittent forward movement of the drive ring and head frame, the roller 46 engages the tip of the brake pawl and presses it outwardly into the path of one of the drive projections 37 as shown in FIGURE 4.

When this projection 37 engages the pawl nib 45a the brake ring is constrained to rotate with the drive ring and head frame whereby the plunger 38 of the brake cylinder 43 is pulled upwardly. The brake cylinder forms a pneumatic dashpot for which purpose it is sealed at each end while also the plunger 38 is formed with a restricted leakhole 38a through which air may pass from one end to the other of the cylinder while in addition the plunger is preferably urged downwards by a light return spring 39. Thus when the plunger 38 is pulled upwards by the brake ring it compresses the air in the upper end of the cylinder so that the continued forward movement of the head frame is resiliently resisted.

Consequently when the plunger of the drive cylinder completes its downward movement as determined by a suitable adjustable stop, the rotation of the head frame is quickly and smoothly arrested due to the resilient resistance offered by the brake cylinder.

The drive cylinder control valve 49 which is preferably operated automatically by suitable timing mechanism is then again operated to cause the plunger of the drive cylinder to return to its normal uppermost position and the drive ring 30 is simultaneously returned to its normal position by means of a spiral spring 47 (FIGURES 2 and 5) which has its outer end connected at 48 to the lug 34 on the drive ring and its inner end fixed to the supporting column 10.

Also as the drive ring is returning to its normal position, the roller 46 carried thereby, releases the brake pawl 45 so that the latter is disengaged by its spring. The plunger of the brake cylinder is then free to move downwards to its original position under the influence of the return spring and the residue of fluid pressure in the upper end of the cylinder. Thus the brake ring is also restored to its original position.

The aforesaid driving mechanism being operated by compressed air and being simple in construction and readily accessible is suitable for use on sheep stations and the like where skilled mechanics are often not readily available. The same driving mechanism may also be used for actuating rotary conveyors of different sizes supporting different numbers of animal carriers provided that the hub tube carries the requisite number of driving projections 37. Thus in the case of a head frame fitted with eight animal carriers 50, the hub tube is provided with eight driving projections and the head frame is rotated through 45° during each movement thereof instead of through an angle of 60° as in the illustrated six station plant. Likewise in a four-station plant the stations are 90° apart and the stroke of the plunger of the driving cylinder is appropriately adjusted by means of the aforesaid stop means.

Referring now to FIGURES 7 to 10, the beam 51 of each sheep carrier 50 is of hollow box shape in cross-section and has a relatively wide longitudinally extending slot 52 in the bottom thereof, this slot being defined between upwardly turned flanges 51a which are spaced inwardly from the respective side walls of the beam.

A bracket 53 is secured rigidly to the bottom of the beam near one end thereof and this bracket supports the upper ends of a transversely opposed pair of curved tubular arms 54 each having a laterally projecting leg clamp 56 pivoted to the lower end thereof so as to be capable of turning about the lateral axis thereof.

A second and similar transversely opposed pair of curved depending arms 58 arranged near the opposite end of the main beam are similarly fitted at their lower ends with laterally projecting leg clamps 56. The upper ends of these arms are secured to the projecting lower part of a vertical plate 60 which extends centrally through the aforesaid slot 52 in the bottom of the beam. This plate 60 forms the body of a trolley and for this purpose it is provided near each of its ends and within the hollow beam with a transverse pivot pin 61 for a corresponding pair of rollers 62 which run on the bottom of the beam on opposite sides of the slot therein.

One end of the body plate 60 is also formed with a vertical boss for a spring loaded locking plunger 63 which normally engages one of a series of adjustment holes 64 arranged longitudinally in the top of the beam. The lower end of the plunger is fitted below the beam with a handle 65 by which the plunger may be withdrawn from the top of the beam to enable the trolley to be moved along the latter also by means of the said handle.

Thus the distance between the front and rear leg clamp arms 54 and 58 may be adjusted to suit the size of the animals to be handled and if desired the front arms 54 may be similarly adjustable along the beam. It has been found that if the distance between each transversely opposed pair of leg clamps 56 is carefully selected it will be suitable for both large and small animals though provision may be made if desired for adjusting the distance between them.

The construction of the leg clamps 56 is not shown in the drawings as it does not form a part of this invention. These clamps may be of any suitable type which will firmly grip the legs without injury thereto and which will release them quickly and reliably and preferably by the operation of remote control means. Preferably each clamp comprises opposed pneumatic bags arranged within the illustrated split ring type of holder whereby they expand inwardly to grip the legs when inflated and which when deflated quickly release the legs. Irrespective of the construction of the clamps they are preferably operated by compressed air and for this purpose an air pipe 66 extends from each carrier 50 to a manifold 67 mounted on top of the centre plate 23 of the rotatable head frame (FIGURES 1 and 2). This manifold is connected by an axially disposed pipe 68, which rotates with the head frame, to a swivel joint 59 on the upper end of a fixed air pipe 69 arranged centrally within the column 10. Each of the said air pipes 66 is provided with a valve (not shown) which is opened when the respective carrier 50 reaches the unloading station to release the four leg clamps simultaneously.

The aforesaid loading unit 70 arranged at the loading station comprises a trough-like cradle 71 open at one end at least and having downwardly converging side walls so that an animal lying on its back therein is suitably restrained. The cradle is mounted on the upper ends of parallel links 72 which have their lower ends secured to transverse spindles 73 mounted in bearings on a base plate 74. The spindles are also provided with parallel arms 75 which are connected by a link 76 and an air cylinder 77 pivotally mounted on the base has its plunger rod pivoted to one of the arms 75.

Thus the cradle may be raised and lowered by means of the air cylinder but is maintained horizontal at all times. When fully lowered the cradle rests on the floor as shown in broken lines in FIGURES 11 and 12 and when in this position, a sheep standing with its hind end close to the outer end of the cradle is given a back flip into the latter. The converging sides of the cradle exert a wedging action on the inverted animal so that its body movements are suitably restrained.

The cradle is then raised to the position shown in full lines in FIGURE 11 at which time its legs are conveniently arranged for attachment to the four leg clamps 56 of a carrier 50 arranged at the loading station. After the clamps are closed the cradle is lowered leaving the animal suspended from the carrier.

The unloading unit 80 shown in FIGURES 1 and 15 comprises a central pedestal 81 mounted on a base plate and having a horizontal beam 82 secured to its upper end. This beam supports the opposite end portions of a laterally extending tubular frame 83 which when viewed in end elevation as in FIGURE 15 inclines downwardly and outwardly from the beam and is then curved downwardly so that its outer end rests on the floor and this curved portion is covered with sheet metal to form a slide 84 for the animals.

A collapsible open-ended cradle arranged centrally above the beam comprises side walls 85 and 86 and a bottom 87. The side 85 and the bottom are rigidly connected together and are pivotally mounted on an upward extension of the inner end of the lateral frame 83 by pivot pins 88 arranged adjacent to the bottom of the cradle. The opposite side 86 of the cradle is pivotally connected to the adjacent edge of the bottom by hinges 89 and the outer face of that side is pivotally connected to the free upper end of the plunger rod 90 of an air cylinder 91 pivotally mounted on the base. The plunger rod is normally projected as shown in full lines in FIGURE 1 and in broken lines in FIGURE 15 whereby the cradle is maintained in its closed condition in which the side 85 abuts against the adjacent upper end of the frame 83 and inclines upwardly and outwardly and in which the opposite side 86 abuts against the bottom 87 and also inclines upwardly and outwardly.

When the leg clamps 56 of a carrier 50 are simultaneously released after the latter has stopped at the unloading station the animal drops a short distance into the cradle in which it is supported on its back. The plunger rod 90 is then retracted so that the cradle initially swings bodily towards the slide about the pivot pins 88 until the bottom 87 of the cradle rests on the beam 82 after which the hinged side 85 swings outwardly and downwardly until its outer edge rests on the upper end of the slide 84. Thus the animal is discharged legs foremost onto the slide so that it is deposited on its feet on the floor.

Preferably the cradle is provided with a spring mounted false floor 92 which is depressed by the weight of the animal to operate a valve 93 and effect the retraction of the plunger rod as diagrammatically indicated in FIGURE 15.

The supporting table 100 shown in FIGURES 1, 13 and 14 comprises a horizontal top plate 101 which is of hollow shape at the top when viewed in cross section and this plate is secured to the plunger rod 102 of a vertical air cylinder 103 supported on the floor. The top plate is prevented from rotating about the axis of the cylinder by pairs of toggle links 104 which are connected at their upper ends to the bottom of the plate and at their lower ends to the upper end of the cylinder.

When the animal is supported by the leg clamps 56 of a carrier 50 its back is generally appreciably bent and this attitute is inconvenient for some purposes. When however one of the said supporting tables is provided at a required station it may be raised until the animal rests on its back therein.

I claim:

1. Animal handling apparatus comprising an elevated head frame supported for rotation about a substantially vertical axis, a plurality of spaced animal carriers mounted on said head frame at equal distances from the axis of rotation thereof, each of said carriers being adapted to suspend an animal by its four legs, and means operable to rotate said head frame intermittently, thereby to move the carriers in succession to, and arrest them at, each of a plurality of spaced stations including a loading station and an unloading station, and wherein said lastmentioned means comprises, reciprocable drive means, pawl and ratchet mechanisms operable to impart an angular movement of predetermined magnitude to said head frame during each forward stroke of said drive means, means for preventing reverse movements of said head frame and brake means operable to arrest the angular movement of the head frame when said drive means completes each forward stroke.

2. Animal handling apparatus comprising an elevated head frame supported for rotation about a substantially vertical axis, a plurality of spaced animal carriers mounted on said head frame at equal distances from the axis of rotation thereof, each of said carriers being adapted to suspend an animal by its four legs, and means operable to rotate said head frame intermittently, thereby to move the carriers in succession to, and arrest them at, each of a plurality of spaced stations including a loading station and an unloading station, and wherein said lastmentioned means comprises, a drive ring freely mounted for rotation about the axis of the column so as to be capable of turning in either direction, pawl and ratchet means connecting said drive ring to the head frame whereby the latter in constrained to move in unison with the drive ring when the latter is turned in one direction, means for preventing retrograde angular movements of the head frame, a drive unit supported on the column, said drive unit comprising a cylinder connected to a source of fluid under pressure, a reciprocable plunger in the cylinder and means operatively connecting said drive unit to said drive ring.

3. Animal handling apparatus comprising a column, a head frame of approximately circular shape rotatively mounted on said column, said head frame including a hub tube arranged concentrically about and spaced from the column, a plurality of animal carriers arranged on said head frame at equal distances from the rotational axis thereof and at equal angular spacings, two pairs of releasable leg clamps on each of said carriers to suspend an animal by its four legs, a drive ring mounted for rotation in either direction about the axis of the column, pawl and ratchet mechanism connecting said drive ring to the hub tube whereby the latter is caused to move in unison with the drive ring when the latter is turned in one direction, means for preventing retrograde movements of the head frame, a reciprocable drive unit mounted on the column, a flexible member connecting said drive unit to said drive ring to turn the latter and the head frame forwardly in unison, whereby said carriers are intermittently moved in succession to and arrested at a plurality of stations including a loading station and an unloading station, a return spring arranged to rotate the drive ring in the reverse direction, a brake ring mounted co-axially with the drive ring said brake ring being rotatable in forward and reverse directions, pawl and ratchet means operable to cause said brake ring to rotate in unison with the drive ring as the latter approaches the limit of each forward movement thereof and a dashpot operatively connected to the brake ring to resist forward movements thereof.

4. Animal handling apparatus comprising conveyor means movably supported in an elevated position, a plurality of spaced carriers fixed to and supported by said conveyor means, each of said carriers being adapted to suspend an animal by its four legs and means operable to actuate said conveyor means intermittently thereby to move the carriers along an endless path and to arrest them in succession at a plurality of stations including a loading station and an unloading station, and wherein each of said carriers comprises a substantially horizontal beam which extends longitudinally above an animal suspended therefrom, two longitudinally spaced pairs of transversely opposed arms supported by and depending from the beam, a leg clamp on the lower end of each of said arms and means whereby at least one of said transversely opposed pairs of arms is adjustable lengthwise of said beam.

5. Animal handling apparatus according to claim 4 wherein said beam is of hollow box shape in cross section and has a longitudinal slot in the bottom thereof and including a member arranged within said hollow beam so as to be longitudinally movable therein, said longitudinally adjustable pair of depending arms being supported by said member and means for locking said movable member to said beam at alternative positions along the length thereof.

6. Animal handling apparatus according to claim 4 wherein said beam is of hollow box shape in cross section and has a longitudinal slot in the bottom thereof and including a member arranged within said hollow beam so as to be longitudinally movable therein, said longitudinally adjustable pair of depending arms being supported by said member, a spring loaded vertical plunger mounted on said movable member for engagement with any one of a series of adjustment holes in the top of the beam, and a handle connected to said plunger and arranged below the beam for retracting the plunger and for moving the member along the beam.

7. Animal handling apparatus comprising conveyor means movably supported in an elevated position, a plurality of spaced carriers fixed to and supported by said conveyor means, each of said carriers being adapted to suspend an animal by its four legs, means operable to actuate said conveyor means intermittently thereby to move the carriers along an endless path and to arrest them in succession at a plurality of stations including a loading station and an unloading station, and an animal rising or lowering unit arranged at one of said stations, said unit comprising a trough-like cradle having downwardly converging side walls whereby an animal supported on its back therein is restrained against excessive body movements and means operable for raising and lowering said cradle.

8. Animal handling apparatus comprising an elevated head frame supported for rotation about a substantially vertical axis, a plurality of spaced animal carriers mounted on said head frame at equal distances from the axis of rotation thereof, each of said carriers being adapted to suspend an animal by its four legs, and means operable to rotate said head frame intermittently, thereby to move the carriers in succession to, and arrest them at, each of a plurality of spaced stations including a loading station and an unloading station, and including a loading unit arranged at said loading station, said loading unit comprising a substantially horizontal trough-like cradle, open at one at least of its ends and having downwardly converging side walls whereby an animal supported on its back therein is restrained against excessive body movements and means operable to raise and lower said cradle while maintaining it substantially horizontal and so that when it is lowered to its full extent, it is disposed close to the floor.

9. Animal handling apparatus according to claim 8 wherein said means for raising and lowering the cradle comprises spaced parallel links pivotally connected to and supporting the cradle and an air cylinder and plunger operable to raise and lower said parallel links.

10. Animal handling apparatus comprising conveyor means movably supported in an elevated position, a plurality of spaced carriers fixed to and supported by said conveyor means, each of said carriers being adapted to suspend an animal by its four legs and means operable to actuate said conveyor means intermittently thereby to move the carriers along an endless path and to arrest them in succession at a plurality of stations including a loading station and an unloading station, and including an unloading unit arranged at the unloading station, said unloading unit comprising an elevated trough-like cradle normally arranged so that an animal released from a carrier at that station is deposited on its back therein, a fixed support for said cradle, a slide arranged below and at one side of the cradle, and means operable to discharge the animal sidewise from the cradle onto the said slide.

11. Animal handling apparatus comprising an elevated head frame supported for rortation about a substantially vertical axis, a plurality of spaced animal carriers mounted on said head frame at equal distances from the axis of rotation thereof, each of said carriers being adapted to suspend an animal by its four legs, and means operable to rotate said head frame intermittently, thereby to move the carriers in succession to, and arrest them at, each of a plurality of spaced stations including a loading station and an unloading station, and including an unloading unit arranged at the unloading station, said unloading unit comprising a support, a cradle mounted in an elevated position on said support, said cradle comprising two downwardly converging side walls and a bottom, one of said side walls and said bottom being rigidly connected, hinge means connecting the other side wall to the bottom, a lateral slide arranged below the cradle and extending to that side thereof which is adjacent to said hinged side thereof, and means operable to raise and lower said hinged side whereby when the latter is raised to its full extent, the cradle is closed and is arranged in its normal animal receiving position and whereby when said hinged side is lowered, it inclines downwardly and outwardly from the bottom to direct the animal onto said slide.

12. Animal handling apparatus according to claim 11 including means pivotally connecting said rigidly connected bottom and side of the cradle to said fixed support about a longitudinally extending axis, stop means on said fixed support for limiting angular movements of said rigidly connected bottom and side in each direction and said bottom being normally supported horizontally by said means operable to raise and lower the pivoted side whereby as the latter is being lowered, the said bottom tilts downwards towards the slide to the extent permitted by the respective stop means.

13. Animal handling apparatus comprising a column, a head frame of approximately circular shape rotatively mounted on said column, a plurality of animal carriers arranged on said head frame at equal distances from the rotational axis thereof and at equal angular spacings, two pairs of releasable leg clamps on each of said carriers to suspend an animal by its four legs, and means operable to rotate said head frame intermittently thereby to move said carriers in succession to and arrest them at each of a plurality of spaced stations including a loading station and an unloading station, and including an elongated substantially horizontal table arranged at a station spaced from the loading and unloading stations, said table being of upwardly hollow form as viewed in cross section, a vertical raising and lowering cylinder below the table, a plunger therein, a plunger rod extending upwardly from the cylinder and supporting the table and means for preventing angular movements of the table about the axis of the cylinder.

14. Animal handling apparatus comprising conveyor means movably supported in an elevated position, a plurality of spaced carriers fixed to and supported by said conveyor means, each of said carriers being adapted to suspend an animal by its four legs and means operable to actuate said conveyor means intermittently thereby to move the carriers along an endless path and to arrest them in succession at a plurality of stations including a loading station and an unloading station, and wherein each of said carriers comprises a substantially horizontal beam which extends longitudinally above an animal suspended therefrom, two longitudinally spaced pairs of transversely opposed leg clamps arranged below and supported by the beam and means whereby at least one of said transversely opposed pairs of leg clamps is adjustable lengthwise of said beam.

15. Animal handling apparatus comprising conveyor means movably supported in an elevated position, a plurality of spaced carriers fixed to and supported by said conveyor means, each of said carriers being adapted to suspend an animal by its four legs, means operable to actuate said conveyor means intermittently thereby to move the carriers along an endless path and to arrest them in succession at a plurality of stations including a loading station and an unloading station, a trough-like cradle arranged adjacent to the loading station, said cradle having downwardly converging side walls whereby an animal supported on its back therein is restrained against excessive body movements and means operable to move said cradle to and from a position in which the legs of an inverted animal therein are attachable to a carrier located at the loading station.

References Cited by the Examiner
UNITED STATES PATENTS

| | | | |
|---|---|---|---|
| 20,585 | 6/58 | Chapman | 119—103 |
| 84,198 | 11/68 | Krigbaum | 119—103 |
| 259,242 | 6/82 | Suesserott | 119—103 |
| 389,063 | 9/88 | Dimick | 119—103 |
| 621,116 | 3/99 | Mandel | 17—1 |
| 810,181 | 1/06 | Barth | 119—103 |
| 2,460,857 | 2/49 | Sweat | 119—103 |
| 2,904,006 | 9/59 | Wilson | 119—103 |
| 3,081,483 | 3/63 | Hughes | 17—1 |
| 3,092,079 | 6/63 | Strebel et al. | 119—103 |

SAMUEL KOREN, *Primary Examiner.*

HUGH R. CHAMBLEE, *Examiner.*